Figure 1:
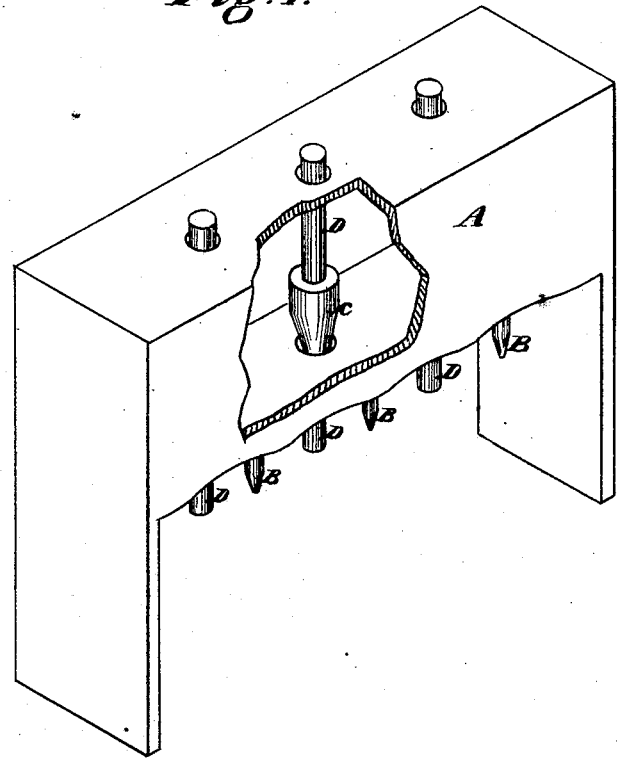

I. B. DILLON.
Sheep Scratch-Box.

No. 159,161. Patented Jan. 26, 1875.

Witnesses
Jno. L. Borne
C. M. Richardson

Inventor
Irai B. Dillon
by Dewey & Co
Attys

UNITED STATES PATENT OFFICE.

IRA BENTON DILLON, OF VISALIA, CALIFORNIA.

IMPROVEMENT IN SHEEP SCRATCH-BOXES.

Specification forming part of Letters Patent No. 159,161, dated January 26, 1875; application filed December 28, 1874.

*To all whom it may concern:*

Be it known that I, IRA B. DILLON, of Visalia, Tulare county, State of California, have invented a Sheep Scratch-Box; and I do hereby declare the following description and accompanying drawings are sufficient to enable any person skilled in the art or science to which it most nearly appertains to make and use my said invention without further invention or experiment.

My invention relates to a novel device for applying a healing ointment to the backs of sheep which are afflicted with scab or other sores; and it consists in the use of a containing-vessel within which the ointment is placed, and it is retained by valves at the bottom. A series of pointed spikes project downward from the bottom of this box, which is placed at a convenient height, so that the animals can pass beneath it, and the operation of scratching their backs will open the valves, so as to allow a portion of the contained liquid to run out upon the back.

Referring to the accompanying drawing for a more complete explanation, Figure 1 is a perspective view of my invention.

A is a containing vessel or box, which may be of considerable length, and is set in some convenient place where the sheep will be likely to go, and at such a height that they can just pass beneath it. Spikes B B project downward from the bottom of the box, and serve for the sheep to scratch themselves upon. The box A is filled with a liquid which will cure the disease of which the sheep may be suffering, and this liquid is retained in the box when not needed by valves *c*. These valves are provided with spindles or guides D, which pass through the bottom of the box, and, when the sheep are scratching themselves, the spindle will be pushed up, so as to open the valves and allow the liquid to run out upon the animal's back.

By this device I am enabled to make medical applications to sheep or other animals with sore backs in an automatic manner.

Having thus described my invention, what I claim, and desire to secure by Letters Patten, is—

The device consisting of the box A, with its spikes B, valves C, and guides D, for the purpose substantially as herein described.

In witness whereof I hereunto set my hand and seal.

IRA BENTON DILLON. [L. S.]

Witnesses:
 ABRAHAM HENDERSON,
 WILEY WATON.